United States Patent
Chien et al.

(10) Patent No.: US 9,880,351 B2
(45) Date of Patent: Jan. 30, 2018

(54) DIRECTLY-MODULATED MULTI-POLARIZATION OPTICAL TRANSMITTERS

(71) Applicant: ZTE (USA) INC., Richardson, TX (US)

(72) Inventors: Hung-Chang Chien, Bridgewater, NJ (US); Zhensheng Jia, Morganville, NJ (US); Jianjun Yu, Basking Ridge, NJ (US)

(73) Assignee: ZTE (USA) Inc., Richardson, TX (US)

(*) Notice: Subject to any disclaimer, the term of this patent is extended or adjusted under 35 U.S.C. 154(b) by 0 days.

(21) Appl. No.: 14/254,296

(22) Filed: Apr. 16, 2014

(65) Prior Publication Data
US 2014/0314368 A1    Oct. 23, 2014

Related U.S. Application Data

(60) Provisional application No. 61/815,076, filed on Apr. 23, 2013.

(51) Int. Cl.
*H04B 10/00* (2013.01)
*G02B 6/10* (2006.01)
(Continued)

(52) U.S. Cl.
CPC ......... *G02B 6/105* (2013.01); *H04B 10/5053* (2013.01); *H04B 10/532* (2013.01); *H04B 10/5561* (2013.01)

(58) Field of Classification Search
CPC .............. G02B 6/105; H04B 10/5561; H04B 10/5053; H04B 10/532
See application file for complete search history.

(56) References Cited

U.S. PATENT DOCUMENTS

| 9,729,250 B2 * | 8/2017 | Yu ..................... H04B 10/6165 |
| 2003/0103534 A1 * | 6/2003 | Braiman ............... H01S 5/4006 |
| | | 372/10 |

(Continued)

OTHER PUBLICATIONS

Ng'oma, A., et al., *Performance of a Multi-Gb/s 60 GHz Radio Over Fiber System Employing a Directly Modulated Optically Injection-Locked VCSEL* (2010), J. Lightw. Technol., vol. 28, No. 16, pp. 2434-2444.

(Continued)

*Primary Examiner* — Danny Leung
(74) *Attorney, Agent, or Firm* — Drinker Biddle & Reath LLP

(57) ABSTRACT

The present invention relates to optical transmitters, transceivers, and transponders used for transmission of information or data in any form through a physical medium dependent (PMD) network. The speed of such networks depends, in part, on the density of information that can be transmitted through the physical medium. Optical transmitters or transceivers can be used to transmit multiple independent signals simultaneously through the same medium using different directions or axes of polarization, where the difference in the directions or axes of polarization can be used to distinguish the multiple signals at the receiver. In this invention, we use a master laser ($l_0$) to synchronize two slave lasers ($l_1$ and $l_2$) by its x-polarization and y-polarization components of carrier, respectively, so that two slave lasers can be enforced to lock on exactly the same wavelength $l_0$ with perpendicular polarization directions.

22 Claims, 4 Drawing Sheets

(51) Int. Cl.
*H04B 10/50* (2013.01)
*H04B 10/532* (2013.01)
*H04B 10/556* (2013.01)

(56) References Cited

U.S. PATENT DOCUMENTS

| | | | | |
|---|---|---|---|---|
| 2005/0259989 A1* | 11/2005 | Sorin | ............... | H04J 14/02 398/79 |
| 2008/0063396 A1* | 3/2008 | Yu | ............... | H04B 10/505 398/42 |
| 2008/0253768 A1* | 10/2008 | Yu | ............... | H04B 10/5165 398/51 |
| 2009/0214210 A1* | 8/2009 | Yu | ............... | H04B 10/5165 398/65 |
| 2010/0329696 A1* | 12/2010 | Yu | ............... | H04B 10/541 398/188 |
| 2011/0081151 A1* | 4/2011 | Yu | ............... | H04B 10/532 398/79 |
| 2011/0182572 A1* | 7/2011 | Klekamp | ........ | H04B 10/07951 398/25 |
| 2012/0195602 A1* | 8/2012 | Nakashima | ........ | H04L 7/027 398/204 |
| 2012/0281201 A1* | 11/2012 | Brown | ........ | G01K 11/32 356/33 |
| 2013/0028603 A1* | 1/2013 | Chien | ........ | H04B 10/5051 398/65 |
| 2013/0330070 A1* | 12/2013 | Yu | ........ | H04B 10/2507 398/16 |
| 2014/0126916 A1* | 5/2014 | Ota | ........ | H04B 10/2569 398/152 |
| 2014/0233949 A1* | 8/2014 | Chien | ........ | H04B 10/6166 398/65 |
| 2014/0314368 A1* | 10/2014 | Chien | ........ | G02B 6/105 385/11 |
| 2014/0341236 A1* | 11/2014 | Yu | ........ | H04J 14/06 370/499 |
| 2015/0222368 A1* | 8/2015 | Yu | ........ | H04B 10/5167 398/211 |
| 2015/0229405 A1* | 8/2015 | Yu | ........ | H04B 10/5167 398/65 |

OTHER PUBLICATIONS

Karar, et al., *Generation and Detection of a 56-Gb/s Signal Using a DML and Half-Cycle 16-QAM Nyquist-SCM* (2013), IEEE Photonics Technology Letters, vol. 25, No. 8, Apr. 15, 2013.

Cui, K., et al., *Thoughts on the practicality of Terabit Ethernet* (2012), IEEE 802.3 Industry Connections HSE Consensus Ad Hoc Meeting (Huawei Technologies Co., Ltd.).

* cited by examiner

DIRECTLY-MODULATED MULTI-POLARIZATION OPTICAL TRANSMITTERS

CROSS REFERENCE TO RELATED APPLICATIONS

This application claims benefit under 35 USC 119(e) to U.S. Provisional Application Ser. No. 61/815,076, filed on Apr. 23, 2013, which is incorporated herein by reference in its entirety.

FIELD OF THE INVENTION

The present invention relates generally to optical transmitters, transceivers and transponders used for transmission of information or data in any form through a physical medium dependent (PMD) network. The speed of such networks depends, in part, on the density of information that can be transmitted through the physical medium. Optical transmitters or transceivers can be used to transmit multiple independent signals simultaneously through the same medium using different directions or axes of polarization, where the difference in the directions or axes of polarization can be used to distinguish the multiple signals at the receiver. More particularly, the optical transmitter may use a master optical signal to synchronize two or more polarized optical signals so that the polarized optical signals are transmitted in phase or in synchronized form while the difference in the polarization of the optical signals is maintained.

BACKGROUND

There is considerable demand for optical, physical medium dependent (PMD) networks capable of an increased speed or bandwidth of data transmission. Currently, high speed optical networks may provide a speed or bandwidth in a range of 100 gigabits per second (100 Gb/s). There is demand, however, for bandwidth in the range of 400 Gb/s and even 1 terabit per second (1 Tb/s). Such increased bandwidth enables all forms of data sharing and processing to function far more quickly and with fewer delays between each associated node on the network and more nodes to be accommodated on the same optical network without modification of the underlying equipment.

Bandwidths above 100 Gb/s, however, are difficult to achieve using currently known technologies.

One alternative used is wavelength division multiplexed (WDM) technology. WDM systems use a separate wavelength for each separate signal—which requires a plurality of light sources and a wavelength division multiplexer for multiplexing and de-multiplexing the different wavelength signals or channels.

Another alternative used is quadrature amplitude modulation (QAM) technology. QAM systems use changing or modulating amplitudes of two carrier waves with the amplitude-shift keying (ASK) digital modulation scheme. The two carrier signals, usually sinusoids, are out of phase with each other by 90 degrees and are thus called "quadrature" carriers or components—which is reflected in the name of the system.

A third alternative used is intensity modulation (IM) or intensity modulation and direction detection (IM/DD) technology. IM and IM/DD are a form of modulation in which the optical power output of a source is varied in accordance with some characteristic of the modulating signal. The envelope of the modulated optical signal is an analog of the modulating signal in the sense that the instantaneous power of the envelope is an analog of the characteristic of interest in the modulating signal. Recovery of the modulating signal is usually by direction detection.

A fourth alternative is discrete multitone modulation (DMT) technology, which uses fast Fourier transform operations at both transmitter and receiver ends.

A fifth alternative is polarization-division multiplexing (PDM) or dual polarization, coherent detection and digital signal processing technology. PDM systems may be used together with phase modulation or QAM, allowing transmission speeds of 100 Gbit/s or more over a single wavelength.

One issue with the use of PDM over fiber-optic transmission systems are the drifts in polarization state that may occur due to physical changes in the fiber and other factors, Over a long-distance system, these drifts may accumulate, resulting in irregular rotation of the polarized light's Jones vector over the entire Poincaré sphere. Polarization mode dispersion, polarization-dependent loss, and cross-polarization modulation are other phenomena that may cause problems in PDM systems.

Thus, there exists a need for an optical transmitter and method of transmission that permits the synchronization of multiple, polarized optical signals and combination of these signals in a form that preserves the differences in their polarization vectors.

SUMMARY OF INVENTION

A dual- or multi-polarization optical transmitter may include a master signal or laser to synchronize the two or more polarized "slave" signals or lasers. This synchronization permits the two or more polarized signals to be transmitted in phase and locked on the same wavelength, thereby minimizing or avoiding the problem of irregular changes or "drift" in phase as the multiplexed signal is transmitted through the medium.

The two slave signals, sources or lasers are described herein as signals $\lambda_1$ and $\lambda_2$. More than two signals may be included in the transmitter and are within the scope of the invention, but for purposes of illustration here, two signals are sufficient for this description.

The master signal, source of laser is described herein as signal as $\lambda_0$, the signal $\lambda_0$ having a fixed or master wavelength. With each of the polarized signals $\lambda_1$ and $\lambda_2$ locked or synchronized to the same wavelength—the master wavelength of signal $\lambda_0$—the polarized signals may be combined and transmitted in phase.

The prior art and illustrative examples of the invention are shown in the attached Figures.

BRIEF DESCRIPTION OF THE FIGURES

Having thus described the invention in general terms, reference is now made to the accompanying drawings, which are not necessarily drawn to scale. The accompanying drawings are included to provide a further understanding of the invention, and are incorporated in and constitute a part of this specification. The drawings illustrate disclosed embodiments and/or aspects and, together with the description, serve to explain the principles of the invention, the scope of which is determined by the claims.

Figure 1:
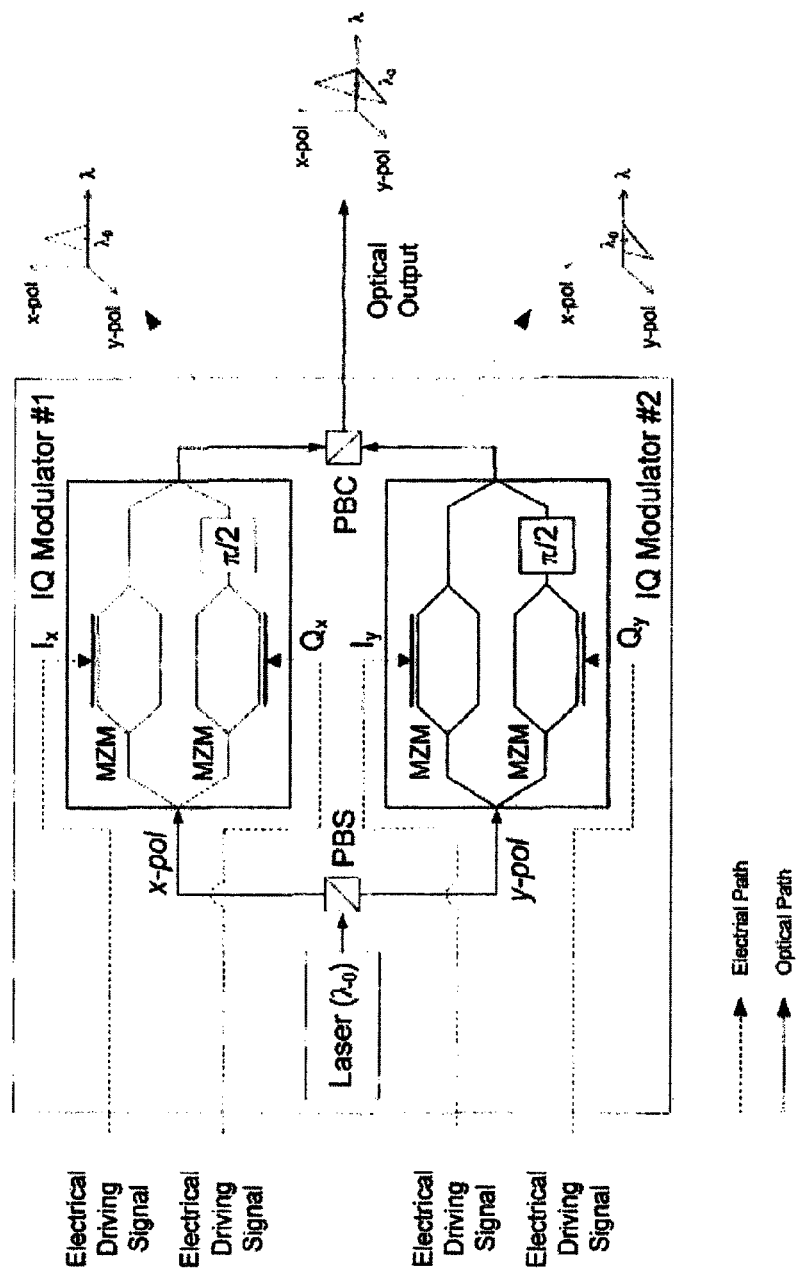

FIG. 1 shows a dual-polarization optical transmitter that includes two nested MZ-I/Q modulators.

Figure 2:
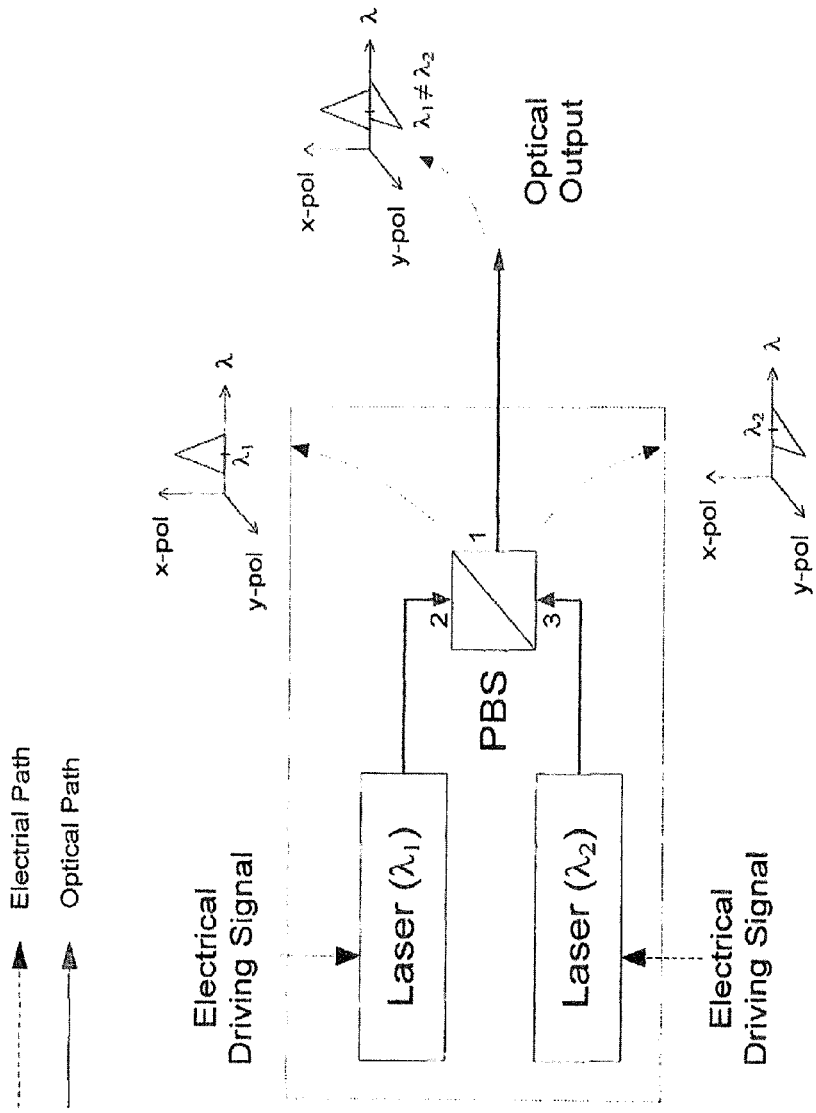

FIG. 2 shows a dual-polarization optical transmitter that includes two directly-modulated, polarized optical signals.

Figure 3:
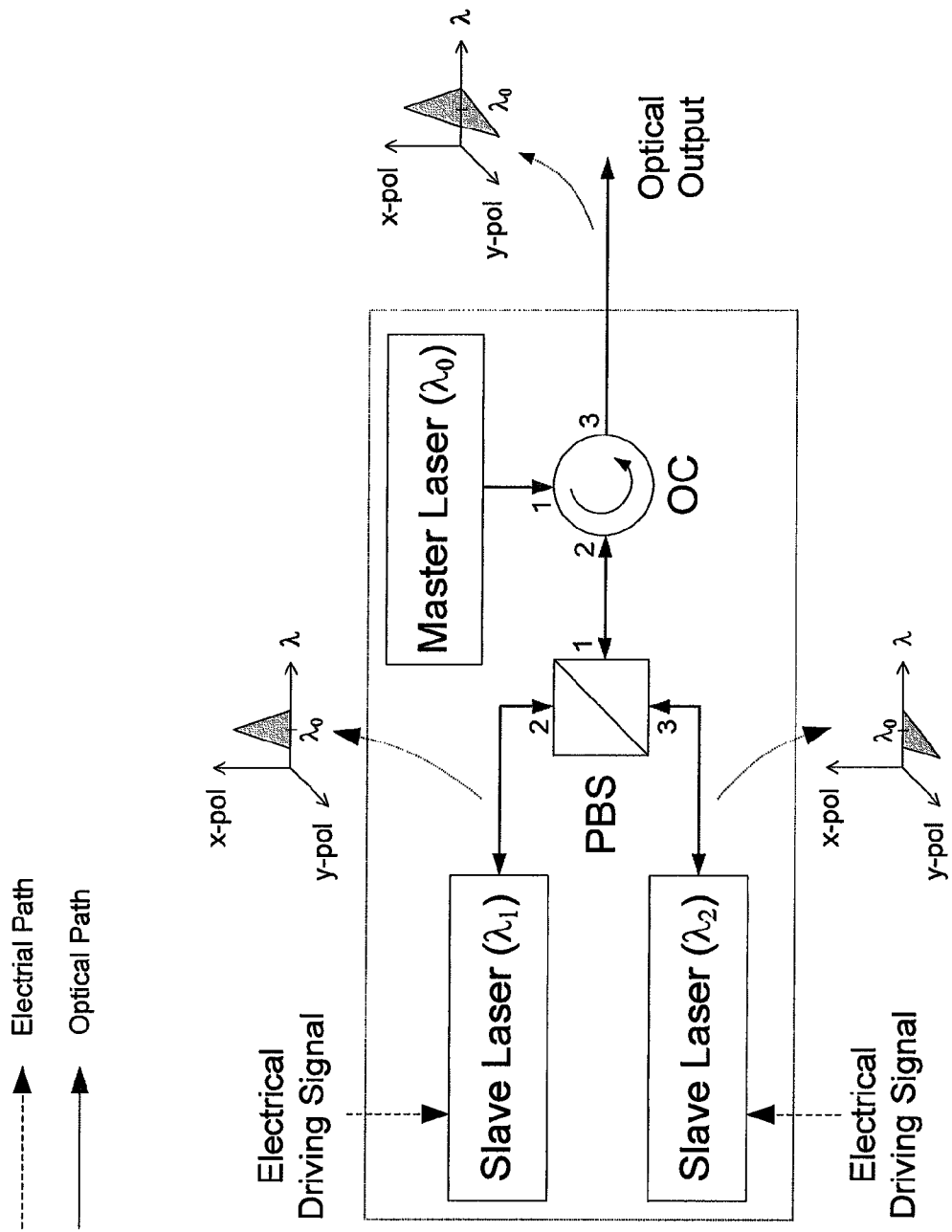

FIG. 3 shows one embodiment of the invention.

Figure 4:
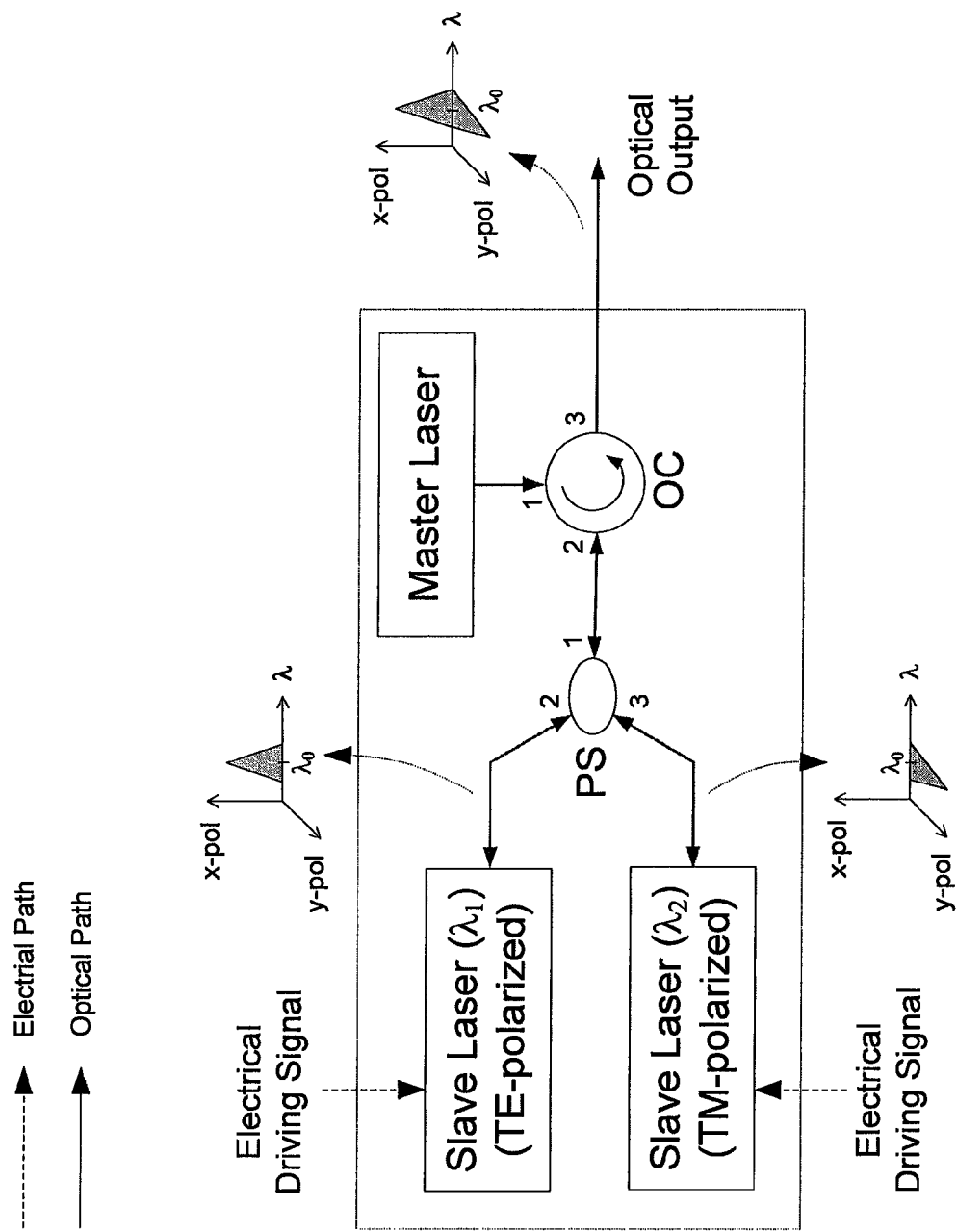

FIG. 4 shows a second embodiment of the invention.

DETAILED DESCRIPTION OF THE INVENTION

The present inventions now will be described more fully hereinafter with reference to the accompanying drawings, in which some examples of the embodiments of the inventions are shown. It is to be understood that the figures and descriptions provided herein may have been simplified to illustrate elements that are relevant for a clear understanding of the present invention, while eliminating, for the purpose of clarity, other elements found in typical optical data transmission system and methods. Those of ordinary skill in the art may recognize that other elements and/or steps may be desirable and/or necessary to implement the devices, systems, and methods described herein. However, because such elements and steps are well known in the art, and because they do not facilitate a better understanding of the present invention, a discussion of such elements and steps may not be provided herein. The present disclosure is deemed to inherently include all such elements, variations, and modifications to the disclosed elements and methods that would be known to those of ordinary skill in the pertinent art. Indeed, these disclosure inventions may be embodied in many different forms and should not be construed as limited to the embodiments set forth therein; rather, these embodiments are provided by way of example so that this disclosure will satisfy applicable legal requirements. Like numbers refer to like elements throughout.

In FIG. 1, which is prior art, a dual-polarization optical transmitter is shown that includes two nested MZ-I/Q-modulators (Mach-Zehnder Modulators) that modulate each half of a laser light or source signal with x-polarization and y-polarization, respectively. The two polarizations are split and combined with two additional components: a polarization beam splitter (PBS) and a polarization beam combiner (PBC), to achieve polarization multiplexing function. However, the illustrated dual-polarization, optical transmitter, originally designed for long-haul optical transport, is bulky and expensive. It includes a CW laser, two $LiNbO_3$ I/Q (in-phase/quadrature-phase) external optical modulators, and two polarization beam splitters/combiners. These components are difficult to be integrated and miniaturized on a single substrate, among other matters.

In FIG. 2, which is prior art, a dual-polarization optical transmitter is shown that includes two directly-modulated, polarized optical signals, called $\lambda_1$ and $\lambda_2$, which are combined by a PBS having ports or terminals identified as 1, 2 and 3. Referring specifically to the PBS, between port 2 and port 1 only x-polarization light can pass through, and similarly between port 3 and port 1 only y-polarization light can pass through. For short-reach applications, the illustrated dual-polarization, optical transmitter by direct modulation may be more favorable than the device shown in FIG. 2 in terms of its lower cost and compactness. But it is difficult to synchronize the two polarized laser or optical signals over a long period of time, which means that the digital demodulation at the receiver side will be problematic. Although this approach is simple and low-cost compared to the device shown in FIG. 1, the misalignment between two wavelengths is a major issue.

An embodiment of the invention is illustrated in FIG. 3. Similar to the device shown in FIG. 2, a PBS is used to combine x-polarization and y-polarization "slave" signals $\lambda_1$ and $\lambda_2$. The illustrated device also includes a master signal or laser $\lambda_0$, used to synchronize the two slave signals so that both are enforced to oscillate on the master signal's wavelength. The device in FIG. 3 also includes an optical circulator (OC) having terminals or ports identified as 1, 2 and 3. Pathways shown in red in the illustration are polarization maintaining waveguides/fibers.

The master signal's synchronization of the two slave signals may be accomplished through optical injection. The modulation bandwidth of slave signals or lasers will be enhanced in proportional to the optical injection power. The pathway for optical injection is shown as follows:

Path 1: Source of master signal or master laser—to OC port 1 or OC1—to OC2—to PBS1—to PBS2—to source of slave signal or laser signal $\lambda_1$—to PBS2—to PBS1—to OC2—to OC3

Path 2: Source of master signal or master laser—to OC1—to OC2—to PBS1—to PBS3—to source of slave signal or laser signal $\lambda_2$—to PBS3—to PBS1—to OC2—to OC3

Synchronization through optical injection is described in A. Ng'oma et al, "Performance of a Multi-Gb/s 60 GHz Radio Over Fiber System Employing a Directly Modulated Optically Injection-Locked VCSEL," J. Lightw. Technol., vol 28, no. 16, pp. 2434-2444 (2010), which is incorporated herein by reference for all purposes.

Options for slave lasers or optical signal sources include but not limit to: reflective semiconductor optical amplifier (RSOA), Farby-Perot laser diode (FP-LD), vertical-cavity surface-emitting laser (VCSEL), reflective electro-absorption modulator (R-EAM)

The PBS and OC are polarization-maintained. The red lines are polarization maintaining waveguides/fibers.

Another embodiment of the invention is illustrated in FIG. 4. In the device illustrated in this Figure, the polarization beam splitter (PBS) of FIG. 3 is replaced by a power splitter (PS), and instead the function of the polarizer is now built inside the slave lasers or signal sources signals $\lambda_1$ and $\lambda_2$. In this illustration, the slave laser or signal source identified as $\lambda_1$ has a transverse-electric (TE) polarization output, and the slave laser or signal source identified as $\lambda_2$ has a transverse-magnetic (TM) polarization output.

As with FIG. 3, synchronization is by use of the master laser or signal $\lambda_0$, the signal $\lambda_0$ having a fixed or master wavelength. One way for accomplishing this synchronization is through the use of optical injection, although other methods are known and may be used here. The pathway for optical injection is shown as follows:

Path 1: Source of master signal or master laser—to OC1—to OC2—to PS1—to PS2—to source of TE-polarized slave signal or laser signal $\lambda_1$—to PS2—to PS1—to OC2—to OC3

Path 2: Source of master signal or master laser—to OC1—to OC2—to PS1—to PS3—to source of TM-polarized slave signal or laser signal $\lambda_2$—to PS3—to PS1—to OC2—to OC3

The PS and OC are polarization-maintained. The red lines are polarization maintaining waveguides/fibers.

Additional background information may be found in the following references, each of which is incorporated herein for all purposes: A. Karar and J. Cartledge, "Generation and Detection of a 112-Gb/s Dual Polarization Signal Using a Directly Modulated Laser and Half-Cycle 16-QAM Nyquist-Subcarrier Modulation," ECOC, Th. 3. A. 4, 2012 (Queen's University), K. Cui et al, "Thoughts on the practicality of Terabit Ethernet", IEEE 802.3 Industry Connections HSE Consensus Ad Hoc Meeting, 2012 (Huawei Technologies Co., Ltd.), and A. Ng'oma et al, "Performance of a Multi-Gb/s 60 GHz Radio Over Fiber System Employing a Directly Modulated Optically Injection-Locked VCSEL," J. Lightw. Technol., vol 28, no. 16, pp. 2434-2444, 2010 (Corning Inc.)

The attached Figures and materials are also incorporated herein by reference for all purposes. Although the invention has been described and illustrated in exemplary forms with a certain degree of particularity, it is noted that the description and illustrations have been made by way of example only. Specific terms are used in this application in a generic and descriptive sense only and not for purposes of limitation. Numerous changes in the details of construction and combination and arrangement of parts and steps may be made. Accordingly, such changes are intended to be included in the invention, the scope of which is defined by the claims.

What is claimed is:

1. A multi-polarization optical transmitter comprising:
    means for generating at least two polarized, modulated optical signals, identified as $\lambda_1$ and $\lambda_2$, wherein there is a difference between a first direction of polarization for signal $\lambda_1$ and a second direction of polarization for signal $\lambda_2$,
    means for generating at least one master optical signal, identified as $\lambda_0$, the signal $\lambda_0$ having a master wavelength,
    means for synchronizing through optical injection the at least two modulated signals $\lambda_1$ and $\lambda_2$ to the master wavelength of the signal $\lambda_0$,
    means for combining the at least two modulated signals $\lambda_1$ and $\lambda_2$ as an optical output signal with at least first and second modulated signal components having first and second directions of polarization, respectively, and
    means for transmitting the optical output signal.

2. The multi-polarization optical transmitter of claim 1, further comprising:
    an optical circulator (OC) in communication with the signal $\lambda_0$, and
    a power splitter (PS) in communication with the OC and the signals $\lambda_1$ and $\lambda_2$,
    wherein the difference in the first direction and second direction of polarization is maintained as the at least two signals $\lambda_1$ and $\lambda_2$ are communicated through the PS and OC.

3. The multi-polarization optical transmitter of claim 1, wherein the means for generating the at least two signals $\lambda_1$ and $\lambda_2$ further comprises at least two lasers.

4. The multi-polarization optical transmitter of claim 3, wherein the at least two lasers are selected from the group consisting of: a Farby-Perot laser diode (FP-LD) and a vertical-cavity surface-emitting laser (VCSEL).

5. The multi-polarization optical transmitter of claim 1, wherein the means for generating the at least two signals $\lambda_1$ and $\lambda_2$ further comprises at least two reflective modulators.

6. The multi-polarization optical transmitter of claim 5, wherein the at least two reflective modulators are selected from the group consisting of: a reflective semiconductor optical amplifier (RSOA) and a reflective electro-absorption modulator (R-EAM).

7. The multi-polarization optical transmitter of claim 1, wherein the first direction of polarization and the second direction of polarization are perpendicular.

8. The multi-polarization optical transmitter of claim 1, wherein the first direction of polarization is transverse-electric and the second direction of polarization is transverse-magnetic.

9. A method for transmitting a multi-polarization optical signal, the method comprising:
    generating at least two polarized, modulated optical signals, identified as $\lambda_1$ and $\lambda_2$, wherein there is a difference between a first direction of polarization for signal $\lambda_1$ and a second direction of polarization for signal $\lambda_2$,
    generating at least one master optical signal, identified as $\lambda_0$, the signal $\lambda_0$ having a master wavelength,
    synchronizing through optical injection the at least two modulated signals $\lambda_1$ and $\lambda_2$ to the master wavelength of the signal $\lambda_0$,
    combining the at least two modulated signals $\lambda_1$ and $\lambda_2$ as an optical output signal with at least first and second modulated signal components having first and second directions of polarization, respectively, and
    transmitting the optical output signal.

10. The method of claim 9, further comprising:
    communicating signal $\lambda_0$ to an optical circulator (OC),
    communicating the at least two signals $\lambda_1$ and $\lambda_2$ to a power splitter (PS) in communication with the OC, and
    maintaining the difference in the first direction and second direction of polarization as the at least two signals $\lambda_1$ and $\lambda_2$ are communicated through the PS and OC.

11. The method of claim 9, wherein generating the at least two signals $\lambda_1$ and $\lambda_2$ further comprises using at least two lasers.

12. The method of claim 11, wherein the at least two lasers are selected from the group consisting of: a Farby-Perot laser diode (FP-LD) and a vertical-cavity surface-emitting laser (VCSEL).

13. The method of claim 9, wherein generating the at least two signals $\lambda_1$ and $\lambda_2$ further comprises using at least two reflective modulators.

14. The method of claim 13, wherein the at least two reflective modulators are selected from the group consisting of: a reflective semiconductor optical amplifier (RSOA) and a reflective electro-absorption modulator (R-EAM).

15. The method of claim 9, wherein the first direction of polarization and the second direction of polarization are perpendicular.

16. The method of claim 9, wherein the first direction of polarization is transverse electric and the second direction of polarization is transverse-magnetic.

17. The multi-polarization optical transmitter of claim 1, further comprising:
    an optical circulator (OC) in communication with the signal $\lambda_0$, and
    a polarization beam splitter (PBS) in communication with the OC and the at least two signals $\lambda_1$ and $\lambda_2$,
    wherein the difference in the first direction and second direction of polarization is maintained as the at least two signals $\lambda_1$ and $\lambda_2$ are communicated through the PBS and OC.

18. The multi-polarization optical transmitter of claim 17, wherein the means for synchronizing the at least two signals $\lambda_1$ and $\lambda_2$ to the master wavelength of the signal $\lambda_0$ further comprises:
    means for communicating the signal $\lambda_0$ to a first OC terminal, from the first OC terminal to a second OC terminal, from the second OC terminal to a first PBS terminal, from the first PBS terminal to a second PBS terminal and a third PBS terminal, and from the second and third PBS terminals to sources for the at least two signals $\lambda_1$ and $\lambda_2$,
    means for synchronizing the at least two signals $\lambda_1$ and $\lambda_2$ to the master wavelength of the signal $\lambda_0$ through optical injection of the signal $\lambda_0$ into the sources for the at least two signals $\lambda_1$ and $\lambda_2$, and means for communicating the at least two signals $\lambda_1$ and $\lambda_2$ to the second and third PBS terminals, from the second and third PBS terminals to the first PBS terminal, from the first PBS terminal to the second OC terminal, and from the second OC terminal to a third OC terminal.

19. The multi-polarization optical transmitter of claim 2, wherein the means for synchronizing the at least two signals $\lambda_1$ and $\lambda_2$ to the master wavelength of the signal $\lambda_0$ further comprises:

means for communicating the signal $\lambda_0$ to a first OC terminal, from the first OC terminal to a second OC terminal, from the second OC terminal to a first PS terminal, from the first PS terminal to a second PS terminal and a third PS terminal, and from the second and third PS terminals to sources for the at least two signals $\lambda_1$ and $\lambda_2$, means for synchronizing the at least two signals $\lambda_1$ and $\lambda_2$ to the master wavelength of the signal $\lambda_0$ through optical injection of the signal $\lambda_0$ into the sources for the at least two signals $\lambda_1$ and $\lambda_2$, and means for communicating the at least two signals $\lambda_1$ and $\lambda_2$ to the second and third PS terminals, from the second and third PS terminals to the first PS terminal, from the first PS terminal to the second OC terminal, and from the second OC terminal to a third OC terminal.

20. The method of claim 9, further comprising:

communicating signal $\lambda_0$ to an optical circulator (OC), communicating the at least two signals $\lambda_1$ and $\lambda_2$ to a polarization beam splitter (PBS) in communication with the OC, and maintaining the difference in the first direction and second direction of polarization as the at least two signals $\lambda_1$ and $\lambda_2$ are communicated through the PBS and OC.

21. The method of claim 20, wherein the step of synchronizing the at least two signals $\lambda_1$ and $\lambda_2$ to the master wavelength of the signal $\lambda_0$ further comprises:

communicating the signal $\lambda_0$ to a first OC terminal, from the first OC terminal to a second OC terminal, from the second OC terminal to a first PS terminal, from the first PS terminal to a second PS terminal and a third PS terminal, and from the second and third PS terminals to sources for the at least two signals $\lambda_1$ and $\lambda_2$, synchronizing the at least two signals $\lambda_1$ and $\lambda_2$ to the master wavelength of the signal $\lambda_0$ through optical injection of the signal $\lambda_0$ into the sources for the at least two signals $\lambda_1$ and $\lambda_2$, and communicating the at least two signals $\lambda_1$ and $\lambda_2$ to the second and third PS terminals, from the second and third PS terminals to the first PS terminal, from the first PS terminal to the second OC terminal, and from the second OC terminal to a third OC terminal.

22. The method of claim 10, wherein the step of synchronizing the at least two signals $\lambda_1$ and $\lambda_2$ to the master wavelength of the signal $\lambda_0$ further comprises:

communicating the signal $\lambda_0$ to a first OC terminal, from the first OC terminal to a second OC terminal, from the second OC terminal to a first PS terminal, from the first PS terminal to a second PS terminal and a third PS terminal, and from the second and third PS terminals to sources for the at least two signals $\lambda_1$ and $\lambda_2$, synchronizing the at least two signals $\lambda_1$ and $\lambda_2$ to the master wavelength of the signal $\lambda_0$ through optical injection of the signal $\lambda_0$ into the sources for the at least two signals $\lambda_1$ and $\lambda_2$, and communicating the at least two signals $\lambda_1$ and $\lambda_2$ to the second and third PS terminals, from the second and third PS terminals to the first PS terminal, from the first PS terminal to the second OC terminal, and from the second OC terminal to a third OC terminal.

* * * * *